Sept. 13, 1938. T. SHAW 2,130,161
HAND TRUCK BODY ASSEMBLY AND METHOD
Filed Sept. 15, 1936
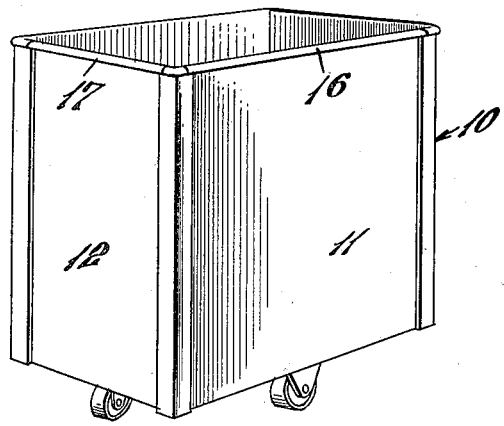
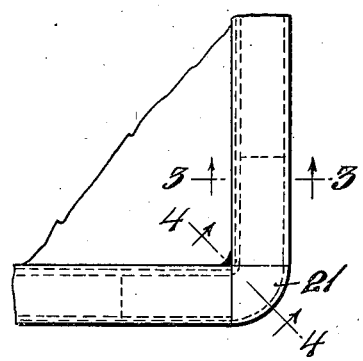
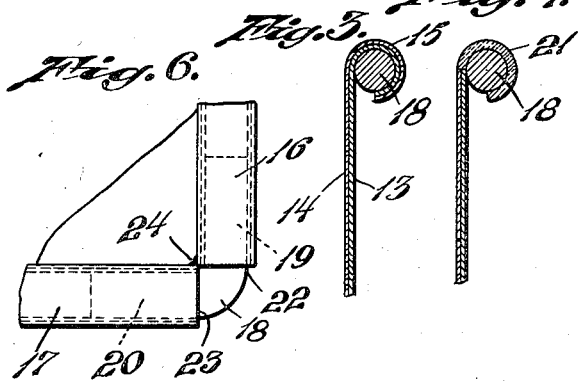
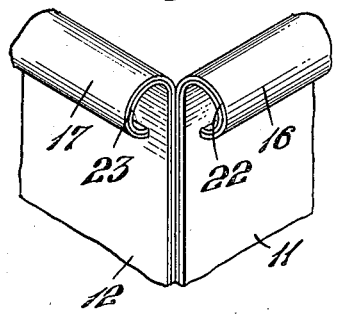
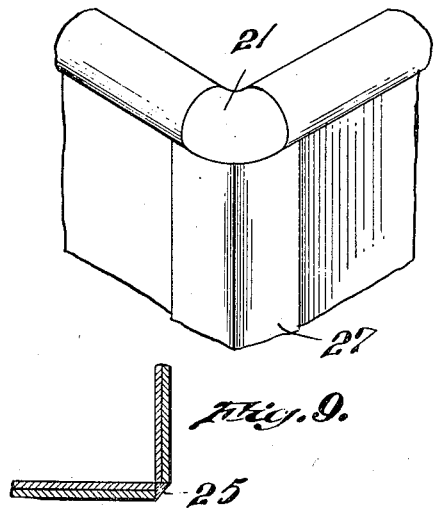
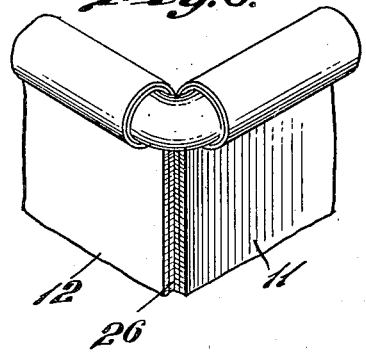
INVENTOR.
Thomas Shaw
BY Barlow & Barlow
ATTORNEYS.

Patented Sept. 13, 1938

2,130,161

UNITED STATES PATENT OFFICE 2,130,161

HAND TRUCK BODY ASSEMBLY AND METHOD

Thomas Shaw, Cranston, R. I.

Application September 15, 1936, Serial No. 100,799

8 Claims. (Cl. 220—73)

This invention relates to a hand truck constructed as specified in greater detail in my co-pending application Serial No. 100,800.

An object of this invention is the formation of a joint at the junction of the side walls of the body particularly at their upper corner so that a smooth surface and a secure construction may be presented at the corner of a truck body.

Another object of the invention is to provide a cover of stainless steel at the upper corners of the truck formed of stainless steel clad material.

A further object is the formation of a corner between the side walls of the truck which may eliminate the necessity of an angle iron at the corner.

With these and other objects in view, the invention consists of certain novel features of construction, as will be more fully described, and particularly pointed out in the appended claims.

In the accompanying drawing:

Fig. 1 is a perspective view of the truck;

Fig. 2 is a top plan view of an enlarged fragmental detail of a corner of the truck;

Fig. 3 is a section on line 3—3 of Fig. 2;

Fig. 4 is a section on line 4—4 of Fig. 2;

Fig. 5 is a perspective fragmental portion of the corner of the truck showing the rolled over edges of the sides;

Fig. 6 is a view similar to Fig. 2 before welding the cover over the core;

Fig. 7 is a perspective view showing the corner as provided in Fig. 2 and also an angle iron secured thereto;

Fig. 8 is a perspective view of the structure shown in Fig. 5 with a core inserted in the rolled edges at the corner;

Fig. 9 is a sectional view of the side walls showing welding material as filling in the juncture between these walls.

In the use of hand trucks it is often difficult to provide a smooth joint or juncture at the upper corner or upper edge of the truck, and structures providing difficult machine operations have been attempted for accomplishing this result. I have, however, provided a simple manner of not only providing a desirable smooth joint, but also securely attaching the side walls at this upper edge and at the same time when stainless steel clad material is used a stainless steel welding cover may be used at this corner and along the junction of the sides to seal the inside surface of the truck against seepage of corrosion from the outer side of the truck; and the following is a more detailed description of the present embodiment of this invention, illustrating the preferred means by which these advantageous results may be accomplished:

With reference to the drawing, 10 designates generally the body of the truck which is formed of side walls 11 and end walls 12. Both of these walls are of stainless steel clad material consisting of a body portion 13 and a plating or coating of stainless steel 14 thereon. These walls are suitably mounted upon a framework which has wheels as is more fully disclosed in my said co-pending application.

The upper edges of the walls 11 and 12 with their stainless coating innermost are rolled outwardly as at 15 to provide the rolled edges 16 on the side wall 11 and the rolled edges 17 on the end wall 12 with the stainless surface outermost and exposed. This rolling of these edges will present a gap at the corners, as illustrated in Figure 5, and in order to fill in this gap and leave no sharp or rough edges at these corners, I insert a core 18 of a suitable metal which is of right angular formation having leg portions 19 and 20, the leg portion 19 extending into the rolled over edge 16 and the leg portion 20 extending into the rolled over edge 17. The dimension of this core will be such as to snugly and tightly fit these rolled over portions 16 and 17. As shown in Fig. 6, this core, although filling the opening between the rolled over portions leaves a gap the thickness of the stock of the portions and in this gap or space I deposit welding material 21, shown clearly in Figures 2, 4 and 7, which welds to the core 18 and also welds to the edges 22 and 23, serving to secure them together in rigid relation and also fix the core against movement. This welding material will be of stainless steel so that the upper outer surfaces of the edges will be stainless steel across the corners.

This welding material as at 24 is shown as also deposited along the inner corner down the edges of the side walls and serves to effectively secure the stainless steel plating of the walls together and prevent seepage of any rust into the interior of the body of the truck. In some cases I will also add the welding material as at 25 to fill in the junction 26 between the corners of the walls 11 and 12, as shown in Figure 7. In some cases, for additional support or to cover the joint I may secure an angle iron 27 at the corner for the accomplishment of this purpose. This angle iron may be either bolted in place or welded in place, as desired.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. In a box truck, generally vertical walls rolled outwardly at their upper edges, a core secured at the corner of said rolled upper edges and of less diameter than the outer surface of said rolled edges, and a filling welded to said core substantially over the entire exposed surface thereof and of a thickness so that the outer surface of said fill shall be substantially flush with the outer surface of said rolled edges.

2. In a box truck, generally vertical walls rolled outwardly at their upper edges through a substantial arc of a circle, a core at the corner of said rolled upper edges of a size to extend into and snugly fit said rolled portions, and a filling welded over said core and to the edges of said rolled portions, and of a thickness substantially the thickness of said walls to present a smooth upper outer surface.

3. In a box truck, generally vertical walls rolled outwardly at their upper edges through a substantial arc of a circle, a core at the corner of said rolled upper edges having its end portion extending into said rolled edges, and a filling welded over substantially the entire exposed surface of said core and to the edges of said rolled portions, said walls being stainless steel clad on their inner surfaces and said welded material also being stainless steel.

4. In a box truck, generally vertical walls at generally right angles to each other rolled outwardly at their upper edges, a core secured at the corner of said rolled upper edges, and a filling welded over substantially the entire exposed surface of said core and of a thickness so that the outer surface of said fill shall be substantially flush with the outer surface of said rolled portions, said fill extending to the edges of said rolled portions and the adjacent vertical edges of said walls being welded together.

5. In a box truck, generally vertical walls at generally right angles to each other rolled outwardly at their upper edges, a core secured at the corner of said rolled upper edges and of less diameter than the outer surface thereof, and a filling welded over substantially the entire exposed surface of said core and of a thickness so that the outer surface of said fill shall be substantially flush with the outer surface of said rolled portions, said fill extending to the edges of said rolled portions, and the adjacent vertical edges of said walls being welded together, said walls having a stainless steel plating on their inner surface and said weld material also being stainless steel.

6. In a box truck, generally vertical walls at generally right angles to each other rolled outwardly at their upper edges through a substantial arc of a circle, a core at the corner of and extending into said rolled upper edges, and a filling welded over substantially the entire exposed surface of said core and of a thickness so that the outer surface of said fill shall be substantially flush with the outer surface of said rolled portions, said fill extending to the edges of said rolled portions, and the adjacent vertical edges of said walls being welded together, and an angle iron covering said welded edges.

7. In a box truck, generally vertical walls at generally right angles to each other rolled outwardly at their upper edges through a substantial arc of a circle, a core at the corner of and extending into said rolled upper edges, and a filling welded over substantially the entire exposed surface of said core and of a thickness so that the outer surface of said fill shall be substantially flush with the outer surface of said rolled portions, said fill extending to the edges of said rolled portions, and the adjacent vertical edges of said walls being welded together, and an angle iron covering said welded edges, and also welded in position.

8. In a box truck, generally vertical walls rolled outwardly at their upper edges, a core at the corner of said rolled upper edges and of substantially less dimension than the outer surface of said outwardly rolled edges, and a filling substantially flush with the outer surface of said rolled edges welded to and substantially covering the entire exposed surface of said core.

THOMAS SHAW.